UNITED STATES PATENT OFFICE.

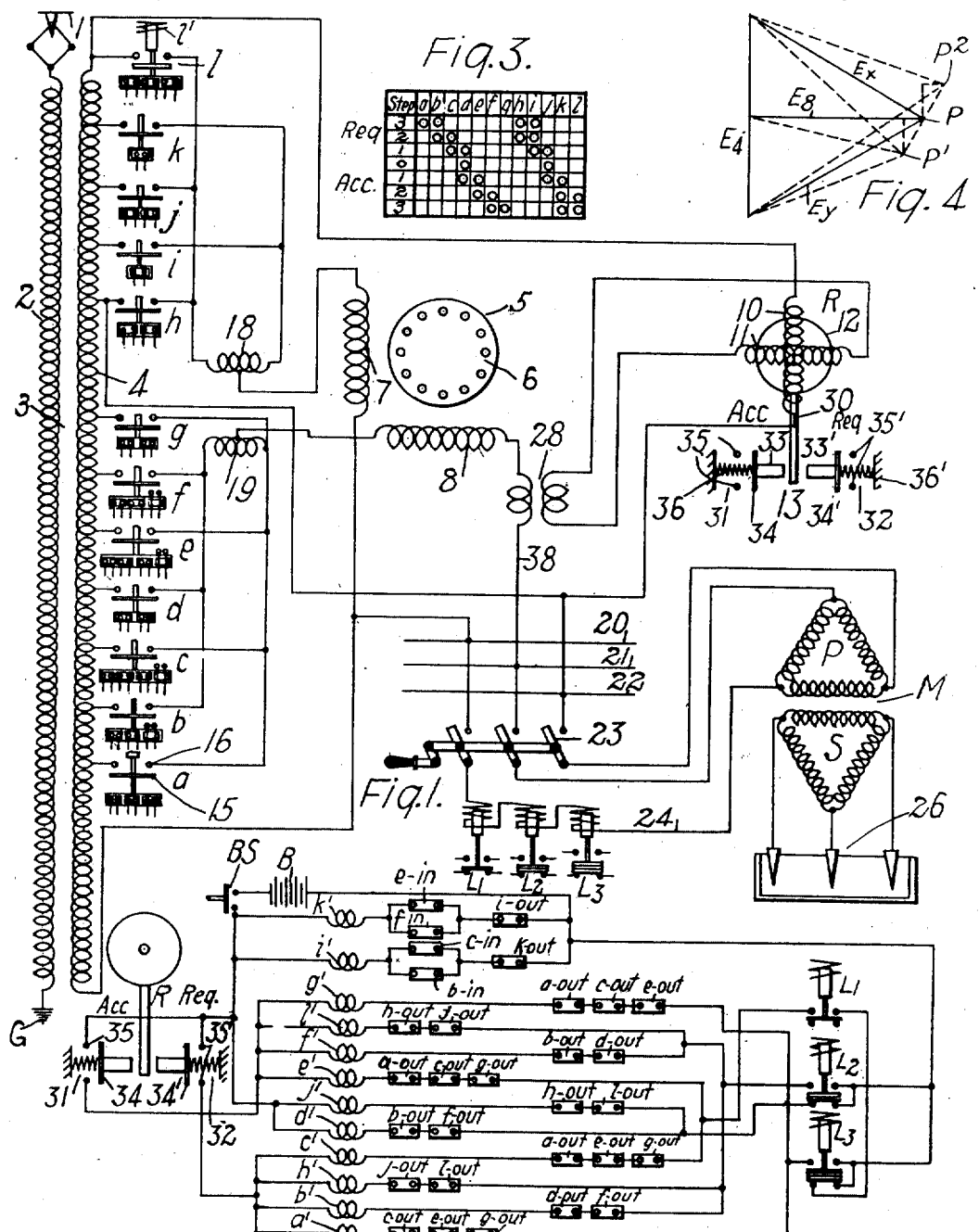

HENRY D. JAMES, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,232,925.  Specification of Letters Patent.  Patented July 10, 1917.

Application filed September 8, 1914. Serial No. 860,606.

*To all whom it may concern:*

Be it known that I, HENRY D. JAMES, a citizen of the United States, and a resident of Wilkinsburg, in the county of Allegheny and State of Pennsylvania, have invented a new and useful Improvement in Control Systems, of which the following is a specification.

My invention relates to control systems for dynamo-electric machines, with special reference to alternating current systems which embody single-phase sources of energy and polyphase dynamo-electric machines that are adapted to operate either as motors or as generators and are connected to the sources of energy through the agency of so-called phase converters which serve to convert single-phase energy into polyphase energy during motor operation and to convert polyphase energy into single-phase energy during regenerative periods.

One of the objects of my invention is to provide a system of the above-indicated class which shall be simple in arrangement and reliable and effective in operation and which shall be adapted to automatically compensate for the inherent phase distortion and reduction of voltage of the phase converter under varying conditions of load, irrespective of whether it be a motor load or a generator load.

Another object of my invention is to provide a control system for a dynamo-electric machine which is connected to a single-phase source of energy through the medium of a phase converter, the excitation and phase relations of which may be regulated by shifting the connections of the converter with respect to the source of energy, and, moreover, to provide auxiliary means for automatically and concurrently varying the excitation and the phase-position of the converter by effecting adjustments of the converter connections to the source of energy.

In a co-pending application, Serial No. 843,929, filed June 9, 1914, by Karl A. Simmon and Arthur J. Hall and assigned to the Westinghouse Electric & Manufacturing Company, a system of control is disclosed for accomplishing the results hereinbefore mentioned. However, this system of control necessitates the employment of a torque motor operating device for actuating a drum controller in successive steps to govern the progression of the switches which connect the converter to the source of energy. Moreover, in order to adapt the torque-operated device for a definite and positive step-by-step movement, apparatus is required which is relatively complicated and special in construction and expensive to manufacture and maintain.

According to my invention, I propose to accomplish the ends hereinbefore referred to, and to do so by means of a combination of control devices of simple and well-known types, and which are so related in the system as to produce the desired result, while being individually required to perform only their usual functions. It is my intention to employ a simple torque relay that shall be responsive to the nature of the load for the purpose of selecting or determining the switches for making the necessary adjustment of circuit conections when the dynamo-electric machine is operated either as a motor or as a generator, and also to employ a plurality of current relays which are adjusted for graduated amounts of currents and are connected to operate successively to automatically govern the progression of the switches in a predetermined sequence and in accordance with circuit conditions.

My invention may best be understood by reference to the accompanying drawing in which Figure 1 is a diagrammatic view of the main circuits and apparatus of a system of control embodying my invention, the auxiliary control switches being shown in connection with the main apparatus with which they are associated and by which they are actuated, and the auxiliary control circuits being omitted for the sake of clearness. Fig. 2 is a diagrammatic view of the auxiliary control apparatus and circuit connections of my system of control, the control interlock switches being distributed throughout the diagram without respect to the main devices with which they are associated, whereby material simplifications in the diagram are permitted which renders the system more readily understood. Fig. 3 is a chart showing the sequence of switches in the various running positions of the system, and Fig. 4 is a vector diagram showing the relationships of certain of the voltages.

Referring to the drawing, the system shown comprises a source 1 and G of single-phase alternating current energy which is connected to primary winding 2 of a transformer 3 having a secondary winding 4; a phase converter 5 having a squirrel cage rotor 6, an exciting winding 7 and a secondary winding 8; a plurality of electrically operated transformer switches $a$ to $l$, inclusive, which are divided into two groups, one of which includes switches $a$ to $g$ and is adapted to adjust the connections of one terminal of the phase-converter secondary winding 8 with respect to substantially the middle portion of the transformer secondary winding 4 for the purpose of effecting compensations for the phase distortion which is inherent in the phase converter 5 under load conditions, and the second group of switches $h$ to $l$, inclusive, being adapted to vary the connections of the exciting winding 7 with respect to the end turns of the transformer winding 4 for the purpose of adjusting the excitation of the converter; a polyphase dynamo-electric machine M of the induction type having primary windings P and secondary windings S and adapted to act either as a motor receiving energy from the source 1 and G through the converter 5 or as a generator driven by the load and delivering energy through the converter 5 to the source 1 and G; a torque-operated relay R which is responsive to the nature of the load of the machine M and is provided with primary windings 10 and 11, a rotor 12 and a switching apparatus 13 adapted to be actuated in accordance with the direction of rotative movement of the relay for the purpose of determining the transformer switches that may be actuated during the different load conditions; and a plurality of electro-responsive current relays $L_1$ $L_2$ $L_3$ that are respectively adjusted for different current values and are respectively adapted to successively govern the different groups of transformer switches in a predetermined sequence and in response to load conditions.

Inasmuch as my invention does not pertain directly to the specific structural details of the phase converter 5, the dynamo-electric machine M and the torque relay R, these devices may obviously be of any suitable construction for performing their intended functions.

The electrically operated switches $a$ to $l$, inclusive, are preferably of the unit switch type and each is provided with one or more auxiliary interlock switches which are arranged and connected, with respect to the auxiliary control circuits and current relays, in such manner as to determine the sequence of operation thereof. Each of these switches is adapted to occupy two positions termed "switch-in" and "switch-out" positions, "switch-in" position indicating that its interlock switch is closed when said transformer switch is closed or occupies its "in" position, while "switch-out" indicates that its interlock switch is closed in the "out" position of said transformer switch.

Except for the number of interlock switches, all of the electrically operated switches $a$ to $l$, inclusive, are of like construction and are respectively provided with operating electromagnets having energizing coils $a'$ to $l'$ and with coöperating movable contact members 15 and stationary contact terminals 16. No further mention will be made of the coöperating contact members, and each switch will be referred to by the letter which designates it.

The several current relays or limit switches $L_1$ $L_2$ and $L_3$ may be of any form familiar in the art, and are constructed or adjusted for operation when traversed by currents of different amounts, as indicated by the different sizes of their movable contact members, for instance: relay $L_1$ may be adapted for operation upon 50% of normal full-load current, $L_2$ for 100% of full-load current, and $L_3$ for 150% of full-load current. Obviously, these relays may be adapted for any other current values.

In order to prevent a local short circuit upon any portion of the transformer winding 4, a plurality of preventive coils 18 and 19 are provided, to the midpoints of which corresponding terminals of the windings 7 and 8 are connected, in the usual manner.

The primary winding P of the motor M is adapted to be connected to a plurality of conductors or bus-bars 20, 21 and 22 through the agency of a suitable switching device 23, and the several current relays $L_1$, $L_2$, and $L_3$ are preferably connected in series-circuit relation in one of the motor leads 24 between one pole of the switch 23 and the motor primary winding P. The secondary winding S of the motor M is connected to an adjustable-resistance device 26 which may be of any well-known construction and which is illustrated as a liquid rheostat. The device 26 serves the purpose of reducing the resistance in the secondary circuit of the motor M for the purpose of controlling its acceleration and operation.

Referring again to the torque relay R, its winding 10 constitutes a voltage coil and is connected across a portion of transformer winding 4, while its winding 11 serves as a current coil and is influenced by the load current which traverses a series transformer 28 having a series connection in circuit with the converter secondary winding 8. Thus, the relay R is caused to operate in one direction or the other, dependent upon the torque developed therein, which is a function of the load current flowing in the one or the other direction in accordance with the nature of the load upon the machine M.

Associated with the rotor 12 of the relay R is an arm 30 that engages and actuates the one or the other of the auxiliary switches 31 and 32 comprising the switching apparatus 13, in accordance with the direction of rotative movement of said relay. The switch 31 comprises an actuating member 33 which carries a movable switch member 34 that is normally held out of engagement with stationary contact terminals 35 by a spring 36 and is adapted to coöperatively engage said terminals 35 when actuated by the arm 30. The switch 32 comprises similar elements 33', 34', 35' and 36'. When the dynamo-electric machine M is acting as a motor, the relay R operates to actuate switch 31, whereby circuit connections for acceleration are established, while the generator operation of the machine M effects the actuation of switch 32 and establishes control circuit connections for regenerative operation. Switch 31, therefore, is termed the "accelerating switch" and is marked "Acc.," while switch 32 is the "regenerative switch" and is marked "Reg."

Assuming the various apparatus and circuit connections to occupy the positions shown in the diagrams, the operation of the system is as follows: Battery switch BS is first closed to complete a circuit from the positive terminal of battery B which includes switch BS where the circuit divides, one branch traversing energizing coil $j'$ of switch $j$, interlock switch $h$—out and interlock switch $l$—out, where it joins the other branch circuit which includes energizing coil $d'$ of switch $d$ and interlock switches $b$—out and $f$—out, and thence traverses relay switch $L_2$ in its lower position, to the negative terminal of battery B. Thus, switches $j$ and $d$ are energized and closed, whereby one terminal of the exciting winding 7 and one terminal of the secondary winding 8 of the converter 5 are connected to transformer winding 4 through portions of the preventive coils 18 and 19, respectively.

Assuming that the converter 5 has already been brought to its full running speed and that the voltage of its secondary winding 8 is substantially 86.6% of the voltage of the active portion of the transformer winding 4, it is evident that balanced three-phase voltages are delivered to the bus-bars 20, 21 and 22, inasmuch as bus-bar 20 and bus-bar 22 are connected substantially across the portion of transformer winding 4, which serves to excite the converter winding 7, and bus-bar 21 is connected to lead 38, which includes the converter secondary winding 8.

This arrangement of circuit connections corresponds to the well known Scott or T connection and is set forth in detail in a copending application, Serial No. 808,714 filed Dec. 26, 1913, by Benjamin G. Lamme and assigned to the Westinghouse Electric & Manufacturing Company. The relationship of voltages upon the bus-bars 20, 21 and 22 under these conditions is indicated in Fig. 4 in which $E_4$ represents the voltage of the active portion of the transformer winding 4, $E_8$ the voltage of the converter secondary winding 8, and $E_x$ and $E_y$ the other phase voltages of the energy delivered to the bus-bars. Voltages $E_4$ $E_x$ $E_y$ are of equal value and, hence, balanced relations obtain.

If the switch 23 is now closed to connect the machine M to the bus-bars 20, 21 and 22 and the starting resistance device 26 is operated to exclude resistance from the secondary windings S of machine M, said machine is brought up to speed as a motor. Therefore, the motor current traversing the series transformer 28 causes the torque relay R to be rotated in a clockwise direction to actuate the accelerating switch 31 and effect the engagement of switch members 34 and 35.

Following this operation, as soon as the current has increased to 50% of the full load current, relay $L_1$ is raised and establishes a circuit from battery B through switch BS, switch members 34 and 35, energizing coil $e'$ of switch $e$, interlock switches $a$—out, $c$—out and $g$—out, relay switch $L_1$ in its upper position and relay switch $L_3$ in its lower position to the negative side of the battery. Switch $e$, therefore, is energized and closed and, in so doing, its interlock switch $e$—in completes a circuit from battery B through switch BS, energizing coil $k'$, interlock switches $e$—in and $i$—out to the other terminal of the battery. Switch $k$, therefore, is also closed. The preventive coil 18 is thus connected across a portion of the transformer winding 4 between the taps to which switches $j$ and $k$ are connected, while preventive coil 19 is connected across switch $d$ and $e$, whereby the effective connections of the converter windings 7 and 8 are shifted slightly for the purpose of increasing the excitation of winding 7 through switches $j$ and $k$ and compensating for the phase distortion through switches $d$ and $e$.

It will be understood that so long as the converter is operated at light or no-load, the voltage relations remain substantially balanced as hereinbefore described, but when the machine M takes on a motor load, there is, by reason of the reactive drop in the converter 5, a tendency to distort the phase position thereof and to effect a reduction in converter voltage $E_8$ which results in the point P moving into a position P'. However, as the motor M takes on its load, the connections of the converter windings 7 and 8 are shifted in the manner hereinbefore described, whereby compensations are effected for the reduction in voltage and displacement of phase position.

Assuming now that the motor load increases to full-load conditions, the current relay $L_2$ is raised into its upper position, thereby disengaging its lower contact terminals and deënergizing coils $d'$ and $j'$ whereby the corresponding switches $d$ and $j$ are permitted to open. As the current relay $L_2$ is moved into its upper position and as switch $d$ is dropped out, a circuit is completed from battery B through switch BS, and switch members 34 and 35 of accelerating switch 31, where the circuit divides, one branch including energizing coil $l'$ and interlock switches $h$—out and $j$—out, and the other branch including energizing coil $f'$ and interlock switches $b$—out and $d$—out, where the branch circuits again join and complete a circuit to the negative side of the battery B through relay switch $L_2$ in its upper position. Transformer switches $f$ and $l$ are, therefore, closed, whereby the converter connections are again shifted to correct for the increased voltage reduction and phase distortion of the converter under its additional load.

Should the motor load be increased to substantially 150%, current relay $L_3$ is raised into its upper position, thereby deënergizing coil $e'$ and permitting its corresponding switch $e$ to be opened. As switch $e$ drops into its open position, its interlock switch $e$—out completes a circuit from battery B, through switch BS, accelerating switch 31, energizing coil $g'$, interlock switches $a$—out, $c$—out and $e$—out and relay switch $L_3$ in its upper position to the battery. Thus, switch $g$ is closed, whereby the phase distortion, due to the overloaded condition of the motor M, is corrected. No further increases of excitation of the converter, however, are effected under these conditions.

It is clear, therefore, that the several current relays $L_1$ $L_2$ and $L_3$ act successively and in accordance with load conditions to automatically effect compensations for voltage reduction and phase distortion of the three-phase voltages that are supplied to the motor M.

Under certain conditions of operation, particularly if the system is used in connection with an electric railway vehicle or with a fly-wheel, it is evident that, at times, the machine M will be driven as a generator by the inertia of the moving parts and will, therefore, regenerate energy through the converter 5 to the source 1 and G in a reverse direction.

Inasmuch as the current through auxiliary series transformer 28 is thus reversed, the effect upon the torque relay R is to reverse its direction of operation and to cause it to actuate the regenerative switch 32 to determine the transformer switches which may be operated for controlling the generator action of the motor in response to the load and the action of current relays $L_1$ $L_2$ and $L_3$.

On account of the similarity of operation of the system under conditions when the dynamo-electric machine M operates as a generator to that hereinbefore described, it is believed that no difficulty will be experienced in understanding the action and, hence, no description thereof is deemed necessary.

It will, of course, be understood that, during the regenerative period, the distortion of phase position is in the opposite direction to that already discussed in connection with the motor operation, and the voltage change is an increase instead of a decrease, thus causing the point P to move to position $P^2$.

Although I have shown and described my invention as embodying a specific arrangement of parts and circuit connections, obviously, my invention is not restricted to these details but is broadly applicable to systems and apparatus differing widely from that which I have set forth for illustrative purposes, and I, therefore, desire that only such limitations shall be imposed as are indicated in the appended claims.

I claim as my invention:

1. In a control system, the combination with a source of single-phase energy, a polyphase dynamo-electric machine, and phase-converting means connected between said source and said machine, of a plurality of electrically operated switches for connecting said converting means to said source, a plurality of current relays for governing the actuation of said switches, and electro-responsive means for determining the switches to be actuated.

2. In a control system, the combination with a source of single-phase energy, a polyphase dynamo-electric machine and phase-converting means connected between said source and said machine, of a plurality of electrically operated switches for connecting said converting means to said source, a plurality of current relays adjusted for different amounts of current for automatically governing the progressive closure of said switches, and an electro-responsive switching device for selectively determining the switches to be actuated in accordance with the nature of the load.

3. In a control system, the combination with a source of energy, a dynamo-electric machine adapted to operate as a motor or as a generator, and a phase converter interposed between said source and said machine, of a switching device responsive to the nature of the load and adapted to occupy a plurality of operative positions, a plurality of electrically operated-switches for connecting said converter to said source and dependent upon the operation of said switching device, and a plurality of current relays for automatically governing the operation of said electrically operated switches when said switching device occupies either of its operative positions.

4. In a control system, the combination with a source of energy, a dynamo-electric machine adapted to operate as a motor or as a generator, and a phase converter interposed between said source and said machine, of a plurality of electrically operated switches for connecting said converter to said source, auxiliary means responsive to the nature of the load conditions for selecting groups of switches respectively for motor operation and for generator operation, and a plurality of electro-responsive relays adjusted for different amounts of current for governing the progressive closure of the switches of each group in accordance with load conditions.

5. In a control system, the combination with a source of energy, a dynamo-electric machine adapted to operate as a motor or as a generator, and a phase converter interposed between said source and said machine, of a plurality of electrically operated switches for connecting said converter to said source, torque-operated means for selecting said switches in accordance with the nature of the load, and a plurality of series current relays adapted for different current values and to be successively operative in governing the operation of said selected switches.

6. In a control system, the combination with a source of energy, a translating device adapted to receive energy therefrom, and a plurality of electrically operated switches for varying certain connections of said translating device, of a plurality of electro-responsive relays for governing the actuation of said switches, and other electro-responsive means for determining the switches to be actuated.

7. In a control system, the combination with a source of energy, a translating device adapted to receive energy therefrom, and a plurality of electrically operated switches for varying certain connections of said translating device, of a plurality of electro-responsive devices respectively adjusted for different operating conditions and adapted to successively govern the progression of certain of said switches in a predetermined order, and an electro-responsive switching device for selectively determining the switches to be actuated in accordance with the nature of the load of said translating device.

8. In a control system, the combination with a source of energy, a translating device adapted to receive energy therefrom, and a plurality of electrically operated switches for connecting said translating device to said source of energy, of a plurality of current relays adjusted for graduated amounts of current for successively and automatically governing the operation of certain of said switches, and a switching device responsive to the nature of the load of said translating device and adapted to occupy a plurality of operative positions for selectively determining the switches to be actuated .

9. In a control system, the combination with a source of energy, a dynamo-electric machine adapted to receive energy therefrom, and a plurality of groups of electrically operated switches for connecting certain windings of said machine to receive varying voltages from said source, torque-operated means for selecting said groups of switches in accordance with the nature of the load, and a plurality of current relays adapted for different current values and to be successively operative in governing the actuation of said selected switches.

10. In a control system, the combination with a transformer having a plurality of taps, a translating device adapted to be connected thereto, and a plurality of electrically operated switches for connecting said device to said transformer taps, of a plurality of dissimilar current relays for successively governing the progressive operation of certain of said switches, and torque-operated means for selectively determining the switches to be actuated.

11. In a control system, the combination with a transformer having a plurality of taps, a translating device adapted to be connected thereto, and a plurality of electrically operated switches for connecting said device to said transformer taps, of a plurality of current relays adjusted for graduated amounts of current for successively governing the progressive operation of certain of said switches, and an electro-responsive switching device for selectively determining the switches to be actuated in accordance with the nature of the load of said translating device.

12. In a control system, the combination with a source of energy, a dynamo-electric machine adapted to act as a motor or as a generator, and a plurality of electrically controlled switches for varying certain connections of said machine, of a plurality of electro-responsive relays for governing the actuation of said switches, and other electro-responsive means dependent upon the nature of the operation of said machine for selectively permitting the operation of only certain switches.

13. In a control system, the combination with a source of energy, a dynamo-electric machine adapted to act as a motor or as a generator, and a plurality of electrically controlled switches for varying certain connections of said machine, of torque-operated means for selecting certain switches in accordance with the nature of the operation of said machine, and a plurality of current relays adapted to be successively operative to govern the action of the selected switches.

14. In a control system, the combination with a source of energy, a dynamo-electric machine adapted to act as a motor or as a generator, and a plurality of electrically controlled switches for varying certain connections of said machine, of a plurality of electro-responsive devices respectively adjusted for different operating conditions and adapted to successively govern the progression of certain of said switches in a predetermined order, and an electro-responsive switching device for selectively determining the switches to be actuated in accordance with the nature of the operation of said machine.

15. In a control system, the combination with a transformer having a plurality of taps, a dynamo-electric machine adapted to act as a motor or as a generator, and a plurality of electrically controlled switches for connecting said machine to said transformer taps, of torque-operated means for selecting certain switches in accordance with the nature of the operation of said machine, and a plurality of relays adapted to be successively operative to govern the action of the selected switches.

In testimony whereof, I have hereunto subscribed my name this 25th day of Aug. 1914.

HENRY D. JAMES.

Witnesses:
JAS. H. OPPERMAN,
B. B. HINES.

Copies of this patent may be obtained for five cents each, by addressing the "Commissioner of Patents, Washington, D. C."